United States Patent
Clack et al.

[15] 3,697,730
[45] Oct. 10, 1972

[54] APPARATUS TO PRODUCE DATA COUNT SIGNALS

[72] Inventors: Peter Joseph Clack; James David Wiswell; Anton Hubert Clemens, all of Elkhart, Ind.

[73] Assignee: Miles Laboratories, Inc., Elkhart, Ind.

[22] Filed: Feb. 26, 1971

[21] Appl. No.: 119,263

[52] U.S. Cl. ................235/92 MT, 73/32, 235/92 R, 235/92 CP, 235/92 CC, 235/92 T, 235/151.32
[51] Int. Cl. ..............................................G06m 3/08
[58] Field of Search..........235/92 CC, 92 PL, 92 FQ; 73/32

[56] References Cited

UNITED STATES PATENTS

| | | | |
|---|---|---|---|
| 3,549,870 | 12/1970 | Lay | 235/92 PL |
| 3,349,390 | 10/1967 | Glassman | 235/92 PL |
| 3,586,835 | 6/1971 | Foeh | 235/92 CC |

*Primary Examiner*—Maynard Wilbur
*Assistant Examiner*—Robert F. Gnuse
*Attorney*—Joseph C. Schwalbach, Louis E. Davidson, Harry T. Stephenson and George R. Caruso

[57] ABSTRACT

Apparatus to produce data count signals in a form equivalent to $C/n \pm C'$, wherein $n$ is a variable and $C$ and $C'$ are constants is described comprising a source of an initiating signal, a source of a terminating signal, a first time-base generator, a first gated digital/analog convertor, an amplifier, a second time-base generator, a gated counter and a circuit component for adding or subtracting a desired number of pulses to the gated counter. The two signal sources, the first time-base generator, and the first convertor are connected so that the pulses accumulated in the first convertor between the initiating signal and the terminating signal are directly proportional to $n$. The amplifier is connected between the first and second convertors so as to apply an amplified reference signal to the second convertor which is directly proportional to $n$. The two signal sources, the second time-base generator, the second convertor, the counter and the comparator are connected so as to produce an output signal in the counter directly proportional to $C/n$. The component for adding or subtracting pulses is connected to the counter so that the counter output is directly proportional to $C/n \pm C'$. This apparatus is especially useful to measure specific gravity of liquids by the falling drop method.

5 Claims, 2 Drawing Figures

APPARATUS TO PRODUCE DATA COUNT SIGNALS

BACKGROUND AND PRIOR ART

It is known that the specific gravity of a liquid can be calculated by allowing a drop of the test liquid to fall through a second fluid, measuring the time it takes the drop to fall a given distance and then applying this time value to the formula: S. G. $= C/t + C'$ wherein $t$ is the above measured time, $C'$ is a constant related to the specific gravity of the second fluid and $C$ is a constant related to other variables in the measuring system. A measuring system which provides a readout only in units of time would require a difficult computation in order to obtain the specific gravity since the values for the above constants may have to be obtained by a "trial and error" approach.

It has previously been suggested to utilize either analog division or direct digital conversion to obtain a direct instrument readout in specific gravity. These prior suggestions both have inherent disadvantages. The analog approach does not have the desired accuracy and stability required for precise measurements. The direct digital conversion requires highly complex and expensive apparatus.

Similar problems are faced when it is desired to compute ratios of two nuclear readings, such as in the measurement of blood volume and thyroid uptake. Such measurements require the computation of items having the relationship: $C/n \pm C'$, wherein $n$ is a variable and $C$ and $C'$ are constants.

SUMMARY OF THE INVENTION

In accordance with the present invention, apparatus is provided to produce data count signals in a form equivalent to $C/n \pm C'$, wherein $n$ is a variable and $C$ and $C'$ are constants, which comprises a means for supplying an initiating signal, a means for supplying a terminating signal, a first time-base generator means, a first gated digital/analog converter, an amplifier, a second time-base generator means, a second gated digital/analog converter, a comparator means, a gated counter, and means for adding or subtracting a desired number of pulses to said gated counter, said means for supplying an initiating signal, said first time-base generator means and said means for supplying a terminating signal being connected to said first converter so that the application of an initiating signal will start the first converter accumulating pulses from the first time-base generator means and the application of a terminating signal will stop said first converter from accumulating additional pulses, the time between said initiating signal and said terminating signal and thus the pulses accumulated by said first converter being directly proportional to $n$, said amplifier being connected to said first converter and to said second converter so as to apply an amplified reference signal to said second converter which is directly proportional to $n$, said means for supplying an initiating signal, said second time-base generator means, and said means for supplying a terminating signal being connected to said second converter and to said counter so that said second converter and said counter are reset to zero values upon the application of the initiating signal and begin to accumulate pulses from said second time-base generator means upon the application of said terminating signal, said second converter providing an output signal which is directly proportional to the product of the pulses accumulated therein and the amplified reference signal supplied thereto from said first converter, said comparator being connected to said second converter so as to compare the output signal from said second converter to a selected reference voltage and to stop the second converter from receiving any further pulses from said second time-base generator means when said second converter output signal becomes equal to said reference voltage, thereby producing accumulated pulses in said second converter which are directly proportional to $1/n$, the performance characteristics of said first and second converters and said amplifier being such that the accumulated pulses in said second converter are also directly proportional to $C$, said gated counter being connected for operation in parallel to said second converter to provide a gross number of pulses from said second time-base generator means in said counter equivalent to $C/n$, and said means for adding or subtracting a desired number of pulses to said counter being connected so as to add or subtract pulses equivalent to $C$ to the gross number of pulses in said counter and thereby provide a net data count signal in said counter equivalent to $C/n \pm C'$. This apparatus is more accurate and reliable than the prior art analog devices and less expensive and less complex than the prior art direct digital devices.

DESCRIPTION OF THE INVENTION

Figure 1:
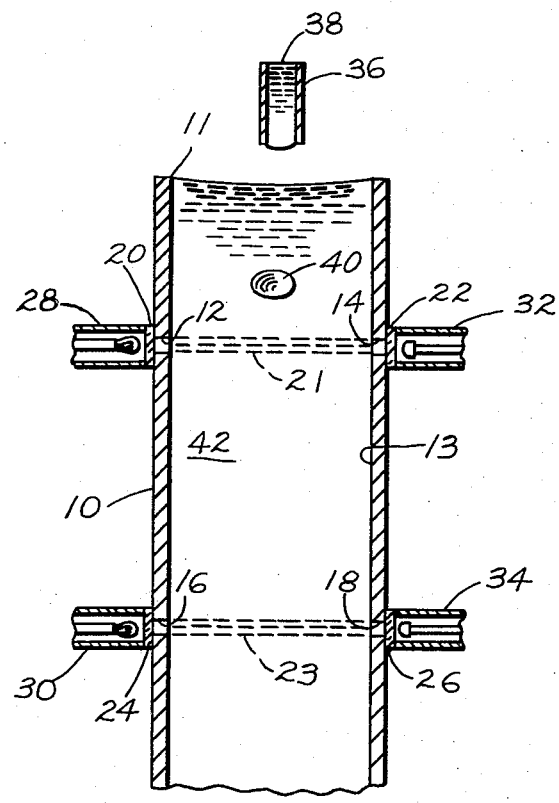
FIG. 1 is a cross-sectional view of a portion of apparatus useful for measuring specific gravity by the falling drop method.

Referring to FIG. 1, a chamber 13 is formed by tubular wall 10 having a mouth 11. Openings 12 and 14 are located in wall 10 in direct opposition to each other. Openings 16 and 18 are also located in wall 10 in direct opposition to each other and are longitudinally spaced below and generally are in direct alignment with openings 12 and 14 along wall 10. The exterior portions of openings 12, 14, 16 and 18 are sealed by transparent members 20, 22, 24 and 26, respectively. Light sources 28 and 30 having appropriate power supplies (not shown) are mounted against transparent members 20 and 24, respectively, so that light rays 21 and 23 from such light sources can pass through openings 12 and 16 and subsequently through openings 14 and 18. Photosensitive devices 32 and 34, such as photoconductors, having appropriate power supplies (not shown) are mounted against transparent members 22 and 26, respectively, so that they can detect light passing through openings 14 and 18. A conduit 36 is positioned coaxially above the mouth 11 in wall 10. Test liquid 38, the specific gravity of which is to be measured, flows through conduit 36 to form a drop 40 which falls away from conduit 36 and into the chamber 13 which forms a column means for storing a fluid, preferably liquid 42, having a specific gravity lower than that of drop 40 and which is immiscible with drop 40. As drop 40 falls through liquid 42, it intercepts or otherwise modifies light ray 21 causing the adjacent photosensitive device 32, a first sensing means, to produce an initiating signal. As drop 40 continues to fall through liquid 42, it intercepts or otherwise modifies light ray 23 causing the adjacent photosensitive device 34, a second sensing means, to produce a terminating signal. Under the falling drop method, the time it takes for drop 40 to fall from light ray 21 to light ray 23 is employed in the calculation of the specific gravity. Sensors, other than photosensitive devices and associated light rays, could also be employed to measure the above elapsed time period. The above description is similar to that of the prior art and does not constitute the principal feature of the present invention.

Figure 2:
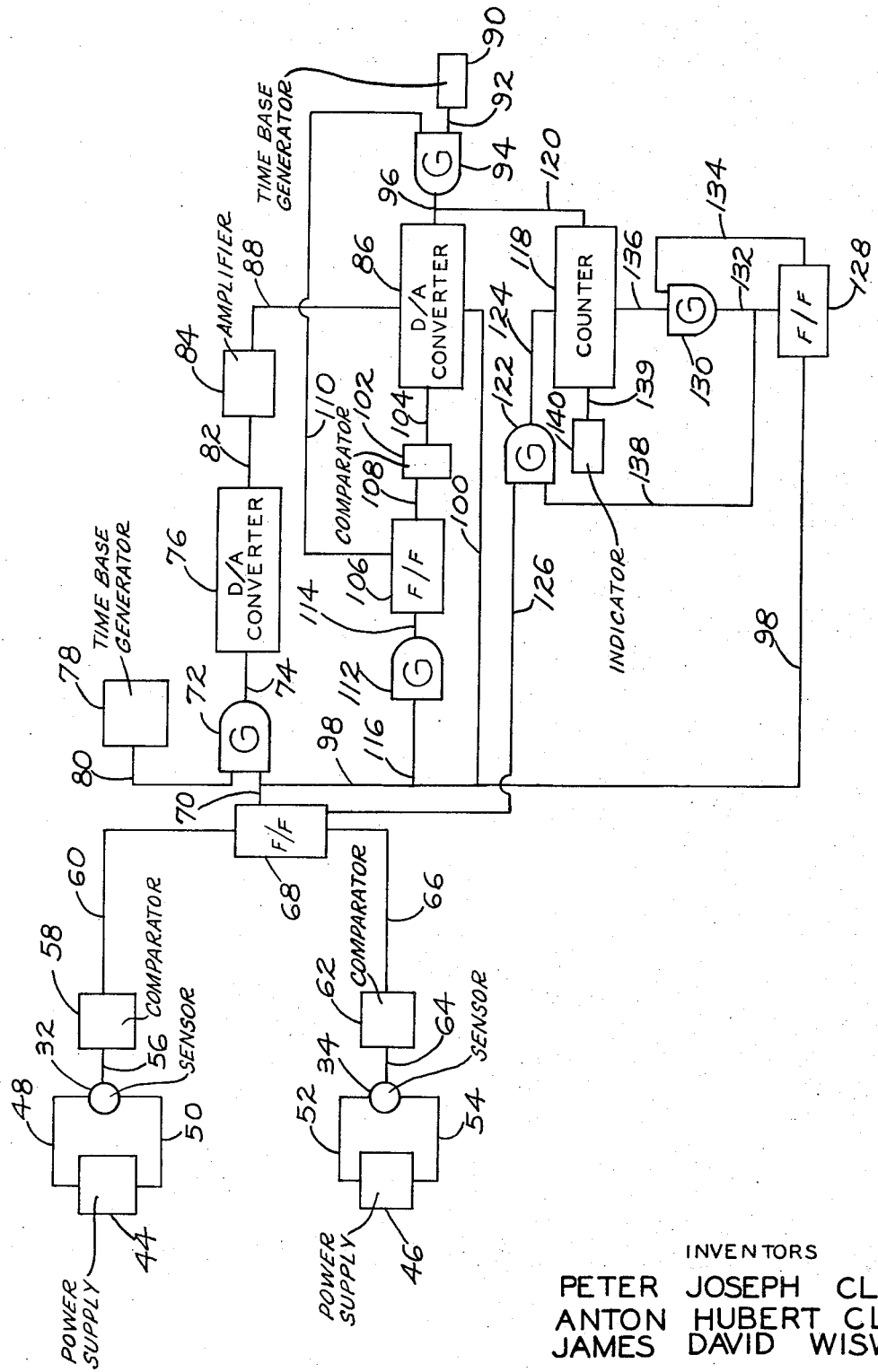
FIG. 2 is a schematic block diagram of the electronic circuitry of the apparatus of the present invention.

Referring to FIG. 2, photosensitive device 32 is connected to a suitable power supply 44 through lines 48 and 50. Photosensitive device 34 is connected to a separate power supply 46 through lines 52 and 54. The power supplies 44 and 46 each contain long time constant voltage regulators (not shown) which are designed to electrically hold the photosensitive devices at their most sensitive position and to allow for slow drift in resistance of the photosensitive device or light level and to allow for replacement of components with a minimum of adjustment. The rapid change in resistance of the photosensitive devices caused by a falling drop interrupting or modifying the light impinging on the device will override the time constant of the power supply and provide an output signal. Such output signal from photosensitive device 32 will pass along line 56 to a diode-type comparator 58. The input to the comparator 58 is capacitor coupled and a reference voltage is also applied to such comparator from a source not shown. Slow voltage changes in line 56 will have no effect on comparator 58, but a relatively fast rising signal (such as that produced by a falling drop interrupting or modifying a light ray) from photosensitive device 32 having a voltage above the reference voltage will activate the comparator and provide an output signal along line 60. This pulse is defined as an initiating signal. The apparatus combination connected to line 60 constitutes the means for supplying an initiating signal. Photosensitive device 34 is connected to a comparator 62 through line 64 in the manner described above and provides a terminating signal along line 66 in the manner described above when the falling drop interrupts or modifies the light ray to photosensitive device 34. The apparatus combination connected to line 66 constitutes the means for supplying a terminating signal.

Lines 60 and 66 are connected to input of a flip-flop multivibrator 68 which is in turn connected through line 70 to a diode-type gate 72. Gate 72 is in turn connected through line 74 to the digital input of a first digital/analog converter 76 to form a first gated converter. This can be a none-bit converter, for example. A first time-base generator 78 is also connected to gate 72 through line 80. This time-base generator means provides a continuous series of electrical pulses evenly spaced in time. The analog voltage output of digital/analog converter 76 is connected to an amplifier 84 through line 82. Amplifier 84 is in turn connected to an input of a second digital/analog converter 86 through line 88. This can be an eight-bit converter, for example. Digital/analog converter 86 is also connected to multivibrator 68 through lines 70, 98 and 100.

A second time-base generator means 90 which provides a continuous series of electrical pulses evenly spaced in time is connected through line 92 to a diode-type gate 94 which is in turn connected to a digital input of the digital/analog converter 86 through line 96. The combination of gate 94 and converter 86 provides a second gated converter. The analog voltage output of digital/analog converter 86 is connected to a diode-type comparator means 102 through line 104. A reference voltage is supplied to comparator 102 from a source not shown. Comparator 102 is in turn connected to a flip-flop multivibrator 106 through line 108. Multivibrator 106 is connected to the gate 94 through line 110 and to a diode-type gate 112 through line 114. Gate 112 is in turn connected to the multivibrator 68 through lines 116, 98 and 70.

A two-decade counter 118 is connected electrically in parallel to the digital/analog converter 86 through line 120. The combination of gate 94 and counter 118 provides a gated counter. A diode-type gate 122 is connected to counter 118 through line 124. Gate 122 is also connected to multivibrator 68 through line 126.

A flip-flop multivibrator 128 is connected to multivibrator 68 through lines 98 and 70. Multivibrator 128 is also connected to a diode-type gate 130 through lines 132 and 134. Gate 130 is in turn connected to counter 118 through line 136. Gate 130 is also connected to the gate 122 through lines 132 and 138. The data count output signal from counter 118 is fed to an indicator means 140, which may take the form of a digital display, through line 139, said indicator means being responsive to such output signal.

The circuit of FIG. 2 is operated in the following manner. When a falling drop activates the photosensitive device 32 and produces an initiating signal in line 60, this sets multivibrator 68 and accomplishes several things. It enables or opens gate 72; it resets first digital/analog converter 76; it resets multivibrator 106 through gate 112; it resets counter 118 through gate 122; it resets multivibrator 128 and second digital/analog converter 86 and disables gate 94. Since gate 72 is opened, pulses from the first time-base generator 78 are fed into and become accumulated in first digital/analog converter 76.

When the falling drop activates the photosensitive device 34 and produces a terminating signal in line 66, this resets multivibrator 68 which accomplishes several things. It disables gate 72 and stops further pulses from the first time-base generator 78 from being fed into and accumulated in first digital-analog converter 76. It also removes the reset or clear signals from the multivibrators 106 and 128 and from the second digital/analog converter 86 and counter 118.

The output signal from the first converter 76 is dependent on the number of pulses accumulated therein and thus on the elapsed time between the initiating and terminating signals. This output signal is appropriately amplified by amplifier 84 and forms a reference voltage for the second converter 86 which is directly proportional to a variable $n$, or to the time, $t$, between the initiating and terminating signals.

When the reset signal is removed from the second converter 86 by the terminating signal, this enables gate 94 and allows pulses from the second time-base generator 90 to be fed into and be accumulated by the second converter 86 and the counter 118. The second converter 86 and the counter 118 then begin to accumulate such pulses in parallel.

When the number of pulses accumulated in the counter 118 reaches a predetermined value representing the constant $C'$, the gate 130 is enabled which resets the counter 118 to zero through lines 132, 138, gate 122 and line 124. The counter 118 then starts accumulating pulses from zero again. When gate 130 is enabled, it sets multivibrator 128 through line 132, which, in turn, disables gate 130 through line 134 to prevent a further resetting of counter 118 to zero.

The output signal from the second converter 86 along line 104 is a function of the number of pulses or counts entering second converter 86 from the second time-base generator 90 times the reference voltage received from the first converter 76 through line 88 times a constant ($C$) which is a function of the characteristics of converters 76 and 86 and amplifier 84. This output signal enters the comparator 102 where it is compared with a preset reference voltage. When the output signal from the second converter 86 reaches this reference voltage, comparator 102 fires, thus setting multivibrator 106 which, in turn, disables gate 94 through line 110 preventing further pulses from entering second converter 86 and counter 118 from the second time-base generator 90. The pulses accumulated in the second converter 86 and the gross number of pulses in counter 118 are thus directly proportional to $1/n$ or $1/t$ and the performance characteristics of the converters 76 and 86 and the amplifier 84 are such that the accumulated pulses are equivalent to $C/n - C'$ or $C/t - C'$. In the event that it is desired to accumulate net pulses in counter 118 which represent $C/n + C'$ or $C/t + C'$, counter 118 can be preset with a predetermined number of pulses equivalent to $C'$ *to which the accumulated pulses equivalent to $C/n$ or $C/t$ can be added.* In this case, gate 130 and multivibrator 128 will be inoperative. If $C'$ is intended to be zero and no pulses are therefore to be added or subtracted from counter 118, its output will represent $C/n$ or $C/t$. In such instance, gate 130 and multivibrator 128 will also be inoperative.

In the computation of specific gravity with the apparatus of the present invention the following theoretical principles are followed.

If $N_1$ equals the pulses accumulated in the first gated converter 76, where $N_1$ is proportional to $t$, and if $A$ is the gain of amplifier 84, then the reference signal applied to the second gated converter 86 through line 88 represents $N_1 \times A \times K_1$, where $K_1$ is the characteristic constant for first converter 76. If $N_2$ equals the number of pulses required by second converter 86 to reach the reference voltage in comparator 102, then the comparator reference equals $N_2(N_1 \times A \times K_1)K_2$, where $K_2$ is the characteristic constant for second converter 86. Therefore, $N_2$ equals the comparator reference voltage divided by the product of $N_1$, $A$, $K_1$ and $K_2$. Since $A$, $K_1$ and $K_2$ are all constant, $N_2 = C/N_1$, where $C$ is the lumped constant. If $N_3$ represents the total net pulses accumulated in counter 118 and $C'$ represents *the number of pulses subtracted by enabling the gate 130*, then $N_3 = N_2 - C'$ or $N_3 = C/N_1 - C'$. Since $N_1$ is proportional to $t$, $N_3 = C/t - C'$.

In the falling drop method, specific gravity (S.G.) of the test liquid is calculated by the formula: $S.G. = C/t = C'$. If the specific gravity of the fluid through which the sample drop falls is less than 1, the constant $C'$ in the above formula should have a negative value and the formula would read $S.G. = C/t - C'$. Since the circuit of the present invention provides a data count signal in counter 118 equivalent to $C/t - C'$, this data count signal can be used as a direct indication of the specific gravity of the falling drop when the surrounding fluid has a specific gravity less than 1.

The following example information relates to an apparatus of the present invention intended to measure specific gravity within the range from 1.000 to about 1.050 and wherein a drop falls through a liquid having a specific gravity less than 1. The digital display 140 connected to counter 118 has two permanent digits 1.0 with the final two digits being displayed by a readout from counter 118. A specific gravity of 1.001 would thus have 1 count in counter 118, while a specific gravity of 1.050 would have 50 counts in counter 118. In another form of the invention, the output count signal from counter 118 can be connected to an indicator means 140 in the form of printer means for printing the specific gravity on a record means. In still another form of the invention the counter 118 output can be fed to indicator means 140 in the form of a computer for storage and subsequent readout.

The gain of amplifier 84 was set so that the output of amplifier 84 would be 100 millivolts per pulse stored in first converter 76. The second converter 86 operating characteristics were such that the second converter 86 output was 1 millivolt / stored count / 10 volts reference voltage from amplifier 84. The reference voltage in comparator 102 was set at 226 millivolts. Second converter 86 thus stopped accumulating pulses when its output voltage equaled 226 millivolts. The counts subtracted from counter 118 by gate 130 were preset at 63. The following table shows the results of operation of the above described apparatus for drops of various specific gravities falling through a liquid having a specific gravity less than 1.

| Specific Gravity of sample | Pulses Stored in Converter 76 | Output Voltage of Amplifier 84 | Counts in Converter 86 to reach 226 mv. | Counts in Counter 118 After subtracting 63 |
|---|---|---|---|---|
| 1.000 | 360 | 36.0 | 63 | 00 |
| 1.001 | 354 | 35.4 | 64 | 01 |
| 1.010 | 310 | 31.0 | 73 | 10 |
| 1.020 | 272 | 27.2 | 83 | 20 |
| 1.030 | 244 | 24.4 | 93 | 30 |
| 1.040 | 220 | 22.0 | 103 | 40 |
| 1.050 | 200 | 20.0 | 113 | 50 |

While the above description is directed principally at measurement of specific gravity, the circuit principles are equally applicable to measurement of other variables having the relationship: $C/n \pm C'$.

What is claimed is:

1. Apparatus to produce data count signals in a form equivalent to $C/n \pm C'$, wherein $n$ is a variable and $C$ and $C'$ are constants, which comprises a means for supplying an initiating signal, a means for supplying a terminating signal, a first time-base generator means, a first gated digital/analog converter, an amplifier, a second time-base generator means, a second gated digital/analog converter, a comparator means, a gated counter, and means for adding or subtracting a desired number of pulses to said gated counter, said means for supplying an initiating signal, said first time-base generator means and said means for supplying a terminating signal being connected to said first converter so that the application of an initiating signal will start the first converter accumulating pulses from the first time-base generator means and the application of a terminating signal will stop said first converter from accumulating additional pulses, the time between said initiating signal and said terminating signal and thus the pulses accumulated by said first converter being directly proportional to $n$, said amplifier being connected to said first converter and to said second converter so as to apply an amplified reference signal to said second converter which is directly proportional to $n$, said means for supplying an initiating signal, said second time-base generator means, and said means for supplying a terminating signal being connected to said second converter and to said counter so that said second converter and said counter are reset to zero values upon the application of the initiating signal and begin to accumulate pulses from said second time-base generator means upon the application of said terminating signal, said second converter providing an output signal which is directly proportional to the product of the pulses accumulated therein and the amplified reference signal applied thereto from said first converter, said comparator being connected to said second converter so as to compare the output signal from said second converter to a selected reference voltage and to stop the second converter from receiving any further pulses from said second time-base generator means when said second converter output signal becomes equal to said reference voltage, thereby producing accumulated pulses in said second converter which are directly proportional to $l/n$, the performance characteristics of said first and second converters and said amplifier being such that the accumulated pulses in said second converter are also directly proportional to $C$, said gated counter being connected for operation in parallel to said second converter to provide a gross number of pulses from said second time-base generator means in said counter equivalent to $C/n$, and said means for adding or subtracting a desired number of pulses to said counter being connected so as to add or subtract pulses equivalent to $C'$ to the gross number of pulses in said counter and thereby provide a net data count signal in said counter equivalent to $C/n \pm C'$.

2. Apparatus according to claim 1 having an indicator means connected to said gated counter.

3. Apparatus for measuring and indicating the specific gravity of a test liquid by the falling drop method wherein a drop of the test liquid falls through a second fluid and the relationship between the specific gravity (S.G.) of the test liquid and the time ($t$) required for a drop thereof to fall a given distance is expressed by the formula S.G. $= C/t \pm C'$ wherein $C'$ is a constant related to the specific gravity of the second fluid through which the drop falls and $C$ is a constant related to other variables in the measuring system, said apparatus comprising column means for storing a fluid, means for providing a falling drop of test liquid to the fluid stored in said column means, first sensing means mounted in conjunction with said column means for supplying an initiating signal when the falling drop passes adjacent to said first sensing means, second sensing means mounted in conjunction with said column below said first sensing means for supplying a terminating signal when the falling drop passes adjacent to said second sensing means, a first time-base generator means, a first gated digital/analog converter, an amplifier, a second time-base generator means, a second gated digital/analog converter, a comparator means, a gated counter, means for adding or subtracting a desired number of pulses to said gated counter and indicator means responsive to an output signal from said counter, said means for supplying an initiating signal, said first time-base generator means and said means for supplying a terminating signal being connected to said first converter so that the application of an initiating signal will start the first converter accumulating pulses from the first time-base generator means and the application of a terminating signal will stop said first converter from accumulating additional pulses, the number of pulses accumulated by said first converter being directly proportional to $t$, said amplifier being connected to said first converter and to said second converter so as to apply an amplified reference signal to said second converter which is directly proportional to $t$, said means for supplying an initiating signal, said second time-base generator means, and said means for supplying a terminating signal being connected to said second converter and to said counter so that said second converter and said counter are reset to zero values upon the application of the initiating signal and begin to accumulate pulses from said second time-base generator means upon the application of said terminating signal, said second converter providing an output signal which is directly proportional to the product of the pulses accumulated therein and the amplified reference signal applied thereto from said first converter, said comparator being connected to said second converter so as to compare the output signal from said second converter to a selected reference voltage and to stop the second converter from receiving any further pulses from said second time-base generator means when said second converter output signal becomes equal to said reference voltage, thereby producing accumulated pulses in said second converter which are directly proportional to $l/t$, the performance characteristics of said first and second converters and said amplifier being such that the accumulated pulses in said second converter are also directly proportional to $C$, said gated counter being connected for operation in parallel to said second converter to provide a gross number of pulses from said second time-base generator means in said counter equivalent to $C/t$, and said means for adding or subtracting a desired number of pulses to said counter being connected so as to add or subtract pulses equivalent to $C'$ to the gross number of pulses in said counter and thereby provide a net output signal from said counter equivalent to $C/t \pm C'$, said output signal being fed to said indicator means to read directly in specific gravity units.

4. Apparatus according to claim 3 wherein said first and second sensing means are photosensitive devices having light sources directing light rays thereon and wherein the falling drop modifies said light rays to produce said initiating signal and said terminating signal from said photosensitive devices.

5. Apparatus according to claim 3 wherein the fluid in the column means has a specific gravity less than 1 and wherein means are provided for subtracting a desired number of pulses from the pulses accumulated in said counter.

* * * * *